United States Patent [19]

Döring et al.

[11] Patent Number: 4,771,527
[45] Date of Patent: Sep. 20, 1988

[54] TOOL TO PLACE A TENSIONING ROLLER-CHAIN AROUND A FLANGE, AND ASSOCIATED TENSIONING ROLLER-CHAIN

[75] Inventors: Klaus Döring, Kreuzau; Herbert Haas, Aachen, both of Fed. Rep. of Germany

[73] Assignee: Kernforschungsanlage Juelich GmbH, Juelich, Fed. Rep. of Germany

[21] Appl. No.: 39,094

[22] Filed: Apr. 16, 1987

[30] Foreign Application Priority Data

Jun. 27, 1986 [DE] Fed. Rep. of Germany ....... 3621694

[51] Int. Cl.4 .............................................. B23P 19/04
[52] U.S. Cl. ................................................... 29/237
[58] Field of Search ..................... 29/271, 272, 237; 269/130, 131, 132, 108, 20; 901/31-39

[56] References Cited

U.S. PATENT DOCUMENTS

| | | | |
|---|---|---|---|
| 788,161 | 4/1905 | Marceau | 269/130 |
| 1,818,435 | 8/1931 | Smith et al. | |
| 2,247,642 | 7/1941 | Neville | 269/130 |
| 2,918,724 | 12/1959 | Thurman | 269/131 |
| 3,292,922 | 12/1966 | Nastev | 269/131 |
| 4,011,979 | 3/1977 | Hagen et al. | 269/132 |

FOREIGN PATENT DOCUMENTS 3026060 1/1982 Fed. Rep. of Germany .
8122699 9/1982 Fed. Rep. of Germany .
1563022 3/1980 United Kingdom .
2174165 10/1986 United Kingdom .

OTHER PUBLICATIONS

Ein Neves Schnellverbindungs-System, Vacuum, vol. 25, No. 3, (Sep. 1974).

*Primary Examiner*—Robert C. Watson
*Attorney, Agent, or Firm*—Shlesinger, Arkwright & Garvey

[57] ABSTRACT

A tool, mainly for placing by remote-control a tensioning roller chain or a like tightening element around a flange, in particular in nuclear works, and thereupon to carry out tightening, the ends of the tensioning roller chain being connected by a tensioning system including a tightening bolt, characterized by gripper members to seize the ends of the tensioning roller chain and by gripper arms on which the gripper members are mounted and of which at least one arm is kinematically displaceable by a displacement system in such a manner that the ends of the tensioning roller chain can be guided around the flange and toward each other, and by a coupling at one of the gripper arms for detachably engaging the tightening bolt so that a tensioning motor may drive the coupling and thereby tighten the roller chain about the flange and so that the gripper arms may thereupon disengage from the coupling and the roller chain remain tightened about the flange.

20 Claims, 3 Drawing Sheets

TOOL TO PLACE A TENSIONING ROLLER-CHAIN AROUND A FLANGE, AND ASSOCIATED TENSIONING ROLLER-CHAIN

The invention concerns a tool used foremost in placing a tension-roller chain by remote control around a flange, in particular in nuclear works, and, in the subsequent tightening, the ends of the tension-roller chain are linked by a tensioning system through a tightening bolt. The invention also concerns a tension-roller chain to be used with the above tool.

Flange-connections used in nuclear equipment and works must meet high requirements and further must be remote-controlled because of the radioactivity prevalent in these places, that is, the flange connection must be mounted, disassembled and maintained without direct access. The economic designs employ manipulators for that purpose, which however demand much space. Accordingly, where space is tight, only flange connections may be used which are equipped directly with costly mechanical, hydraulic, pneumatic or electric devices. These flange connections are very costly because the additional devices are exposed to the same operational conditions as the flange connection and receive the same radiation doses. Moreover, the functioning capability of the additional devices must correspond to that of the flange connection itself. Therefore, the design of the additional devices must be for the service life of the flange connection, which can be thirty years or more.

The most diverse flange connections have been developed for nuclear works. One series of flange connections shares the feature that the two flange parts to be connected always have radially outward annular offsets tapering conically in the radial direction on the sides which are mutually away. To join the two flange parts, annular tensioning elements are placed around the annular offsets, where these elements come to rest by their rest surfaces, also conical, against the conical outer faces of the annular offsets. Thereupon the tensioning elements are tightened in the circumferential direction by a tensioning system, whereby the annular offsets, and hence the flange parts, are compressed by reason of the conical rest surfaces. Essentially, the tensioning system consists of a tightening bolt and a tightening thread at the ends of the tensioning elements which are tightened by rotating the tightening bolt. Basically, there are two designs for the tensioning system. In one design mode the tightening bolt is suspended in articulating manner from one end of the tightening element and engages a thread at the other end of the tensioning element. In the other design mode the tightening bolt is rotatably supported in a thread at one end of the tensioning element and comprises a tensioning hook with which it can engage the other end of the tensioning element.

Suitable tensioning elements illustratively are tensioning rings which either are split in half and, on account of that, must be connected together by two tensioning systems, or else the tensioning rings consist of several ring parts connected together by articulations and therefore require only one tensioning system. Such V band clamps also may be designed as flexible bands.

Further a remote-controlled flange connection is proposed in the periodical VACUUM, vol. 25, #3, pp 97–111, wherein the compression of the conical annular offsets of the flange is carried out using a tensioning roller chain. This tensioning roller chain comprises rollers shaped like yarn spools and supported on roller pins at each hinge, the roller conical annular offsets coming to rest against the outer faces of the ring offsets of the flange parts. By tightening the tensioning roller chain, the flange parts are then compressed in this manner.

In a simple design, the tensioning roller chain comprises merely one tensioning system, whereby it may be placed around the flange circumference and then tightened. A remote-controlled embodiment shown in the above periodical comprises two halves of tensioning roller chains which are coupled by two tensioning systems. The halves of the tensioning roller chain are each guided in inwardly open chain casings in a manner to retain their shape and hence they cannot collapse. A similar shape-retaining guidance for a tensioning roller chain —though with additional support by a spring system—is shown in the German Offenlegungsschrift No. 30 26 060. This design makes possible an integral tensioning roller chain, whereby it can be tightened using only one tensioning system.

Where the above flange connections are not provided with costly, additional devices, their remote control will require manipulators which are quite bulky. Where tensioning roller casings are used as the tensioning elements, care moreover must be expended that until assembly the tensioning roller chain shall not kink, i.e. that it shall retain its proper shape, and as a result additional costs are incurred.

The object of the invention is to discover an economical solution whereby the flange connections of the initially cited kind can be mounted and disassembled by remote control even where space is restricted.

This problem is solved by the invention by a tool such that it features gripper members to seize the ends of the tensioning roller chain and gripper arms on which are mounted the gripper members and of which at least one can be kinematically displaced by a displacement system so that the ends of the tensioning roller chain can be guided around the flange and toward each other, and a coupling on one of the gripper arms to seize the tensioning bolt and a tensioning motor to drive the coupling.

This solution is based on the concept included in the invention that a third part in the form of a tool is provided to connect the manipulator to the flange joint, where this tool allows connecting a flange using a tensioning element, in particular a tensioning roller chain even where space is tight, in a simple manner. No high requirements are placed on the tool because, following assembly or disassembly by the manipulator or other systems, the tool can be removed from the immediate area of the flange connection. It is required only for the mounting or disassembly stages.

In the invention, the tool is characterized by at least one gripper arm pivotable in a plane in such a manner that the tensioning roller chain, following engagement of the ends by the gripper members and following it being rested against the flange will, be laid around the flange while simultaneously being radially displaced. The ends may then be tightened together by the tensioning motor which rotates the tightening bolt. Disassembly can take place in the reverse order. The space required by the entire flange system is comparatively slight, because the flange connection itself requires no additional devices and because the tool of the invention is compact. The same applies also to the manipulator necessary to position this tool. Furthermore, the tool may be made from simple materials, being exposed only short-term to the stresses in the area of the flange connection.

The tool of the invention will be fully adequate with one fixed and one movable gripper arm, provided that the movable gripper arm is designed and driven in such a manner that the tensioning roller chain can be placed around the flange. Then only a corresponding and additional displacement of the tool will be needed, for instance by means of a manipulator. However a symmetric tool design is preferred, with two gripper arms pivoting in one plane by means of displacement systems. This design facilitates handling the tool because, in this latter case, the tensioning roller chain can be placed around the flange from both sides.

Obviously, the size of the tool of the invention must be matched to that of the particular flange connection and to the length of the tensioning roller chain. It was found advantageous that the spacing between the pivot axes of the gripper arms be larger than the flange diameter, especially when this spacing corresponds approximately to the length of the tensioning roller chain. The geometry of the gripper arms clearly must be such that the tensioning roller chain can be fully placed around the flange and that then the tensioning system can be actuated.

The invention further provides that the tool have a base frame at which at least the gripper arm(s) together with its (their) displacement system(s) is (are) displaceably guided in the pivot plane. In this embodiment the tool base frame can be kept fixed in place by the manipulator or another device during the assembly or disassembly of the tensioning roller chain, because the displacement in the radial direction required for the emplacement of the tensioning roller chains takes place by means of a separate device preferably designed as a common slide frame for both gripper arms. This step once more saves space because the displacement of the manipulator can be limited to that needed to move the tool into that position needed to emplace the tensioning roller chain.

Appropriately the displacement of the slide frame is carried out using at least two guide rods on base frame. Using a separate slide cylinder resting on the base frame, the position of the pivot axis of the gripper arm(s) can then be controlled.

In a further embodiment of the invention, the base frame is provided at its front side with a stop strip having projections to engage the tensioning roller chain. Thereby a straight hanging tensioning roller chain is additionally stabilized for gripper-member seizing action, with at least three projections being present.

It is further proposed within the invention that the displacement system(s) driving the gripper arm(s) be designed as pressure cylinders or linear actuators that can be remote-controlled pneumatically or hydraulically.

Appropriately, the gripper members each comprise two seats for bilaterally projecting ends of a roller pin of the tensioning roller chain, these seats being displaceable in the direction of the axes of the roller pins. Pressure cylinders preferably are used to drive each seat.

The tensioning motor to rotate the tightening bolts preferably is designed as a pneumatically driven screw spindle. Preferably also, the coupling and the tightening bolt shall form an inherently locking connection. Illustratively this can be implemented by the tightening bolt having a hexagonal head and the coupling being a matching nut.

The tensioning roller chain used in the tool of the invention advantageously is modified to the extent that the tensioning system comprises a tensioning hook connected by means of a thread with the tightening bolt which is supported in a turn-buckle pivotably suspended from the last link of the tensioning roller chain.

The drawings illustrate the invention in further detail in relation to an embodiment.

Figure 1:
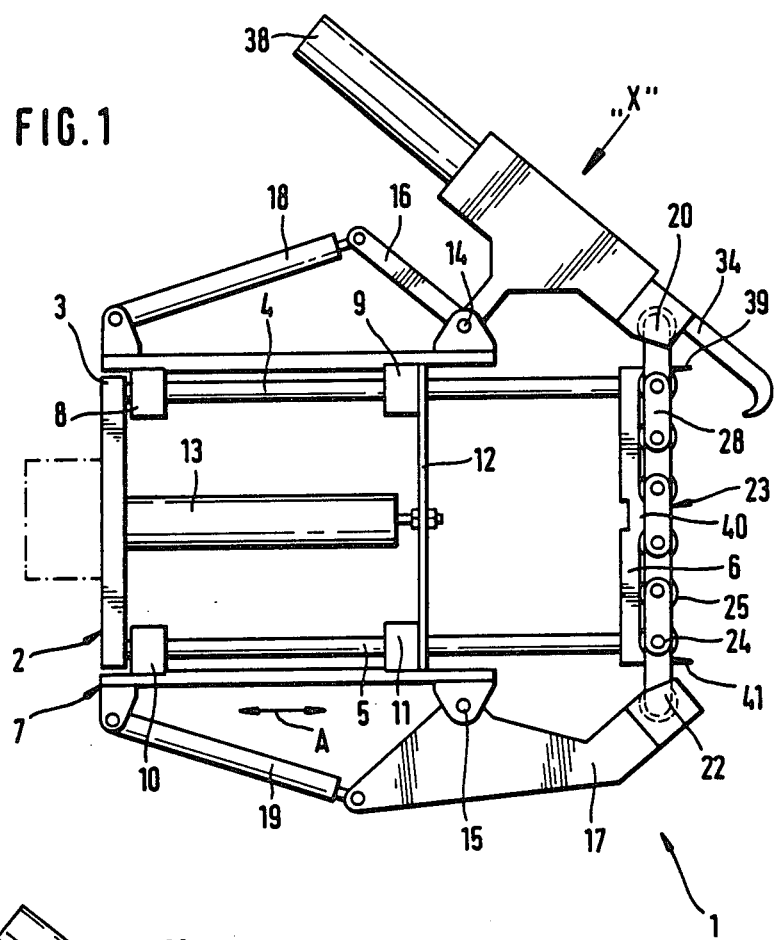
FIG. 1 is a sideview of the tool with the tensioning roller chain included.
Figure 2:
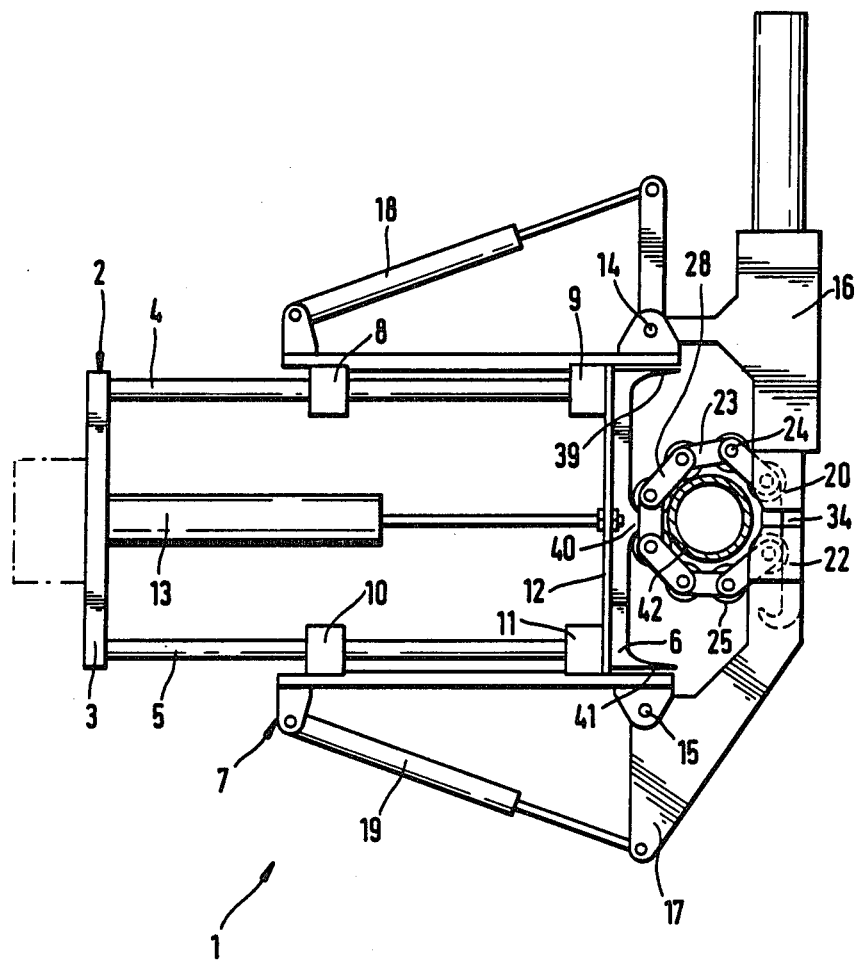
FIG. 2 is a sideview of the tool of FIG. 1 with tensioning roller chain placed around a flange.

The tool 1, as best shown in FIGS. 1 and 2, comprises a base frame 2 consisting of a rear base plate 3, two guide rods 4 and 5 starting from this base plate 3 and extending parallel to each other, and a stop strip 6 connecting the front ends of the guide rods 4, 5. A slide frame 7 is guided on the guide rods 4, 5 in the direction of the double arrow A and in displaceable manner by two mutually spaced ball-bush sets 8, 9, 10, 11. The two halves of the slide frame 7 are connected by a crossbar 12. A telescoping cylinder 13, mounted centrally between the two guide rods 4, 5 and resting at one end on the base plate 3 and at the other end on the crossbar 12, controls the displacement of the slide frame 7.

Gripper arms 16 and 17 are supported at the front end of the slide frame 7 by means of pivot pins 14, 15. The pivot pins 14, 15 are aligned in such a manner that the gripper arms 16, 17 move in a plane.

The gripper arms 16, 17 each are designed as two-arm levers, the rear arms each being connected to a telescoping cylinder 18, 19 resting on the rear end of the slide frame 7. Due to the extension or retraction of these telescoping cylinders 18, 19, the gripper arms 16, 17 can be pivoted about the pivot pins 14, 15.

As follows from the topview of the upper gripper arm 16 as seen in the direction of the arrow X in FIG. 1 and FIG. 3, gripper arm 16 is equipped on both sides with gripper members 20, 21 consisting each of a short-stroke cylinder with inside seats. The lower gripper arm 17 also is equipped at its front end with such gripper members 22. These gripper members 20, 21, 22 seize the ends of a tensioning roller chain 23. To that end the tensioning roller chain 23 is provided with outwardly projecting roller pins—illustratively denoted by 24—over which the seats of the gripper members 20, 21, 22 are slipped upon the short-stroke cylinders being actuated.

Figure 3:
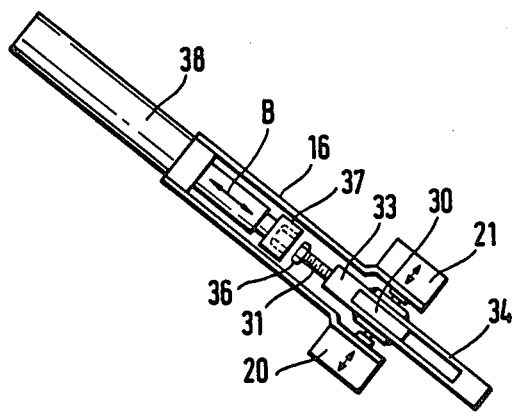
FIG. 3 is a view of a gripper arm of the tool in the direction of the arrow "X" of FIG. 1.
Figure 4:
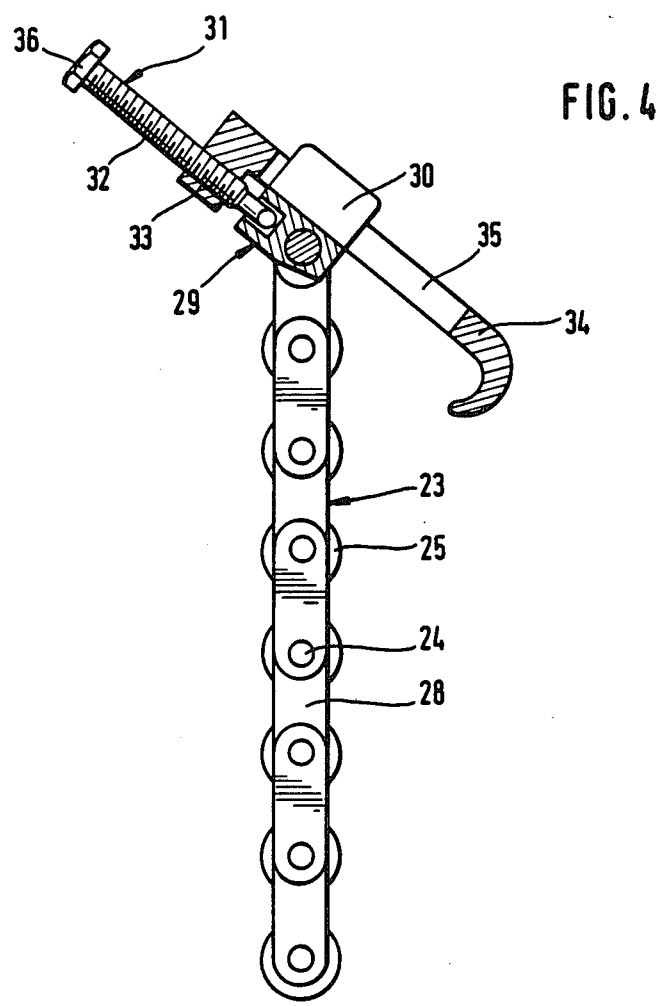
FIG. 4 is the sideview of a tensioning roller chain with a partial cross-section of the tensioning system.
Figure 5:
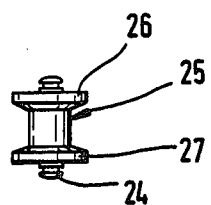
FIG. 5 is the front view of a single roller of the tensioning roller chain of FIG. 4.

As shown in FIGS. 3 and 4, the tensioning roller chain 23 consists of a plurality of single rollers—illustratively denoted by 25—supported on roller pins 24. Each single roller 25 assumes the shape of a yarn-spool, that is, it comprises conically flaring lateral faces 26, 27, as best shown in FIG. 5. The spacing between the faces matches the cone surfaces of the flange to be serviced by the tensioning roller chain 23. The roller pins 24 of each single roller 25 are connected by shackles illustratively denoted by 28.

A tensioning system 29 is provided at the top side of the tensioning roller chain 23, as best shown in FIG. 4. This tensioning system 29 includes a turnbuckle 30 enclosing the uppermost single roller 25. A tightening bolt 31 is rotatably supported in the turnbuckle 30. This bolt has a thread 32 on which is seated the threaded part 33 of a tightening hook 34. The tightening hook 34 has a slot 35 at its center, which is entered by the upper part of the swivel 30.

The thread-side end of the tightening bolt 31 is a hexagonal screw head 36. A displaceable nut 37, matching the screw head 36 and moving in the directions of the double arrow B, is located inside the upper gripper arm 16 as best shown in FIG. 3. The nut 37 is connected to a compressed-air driven screw-spindle 38 mounted to the gripper arm 16. Upon actuation of this screw-spindle 38, the nut 37—and if there is coupling to the screw head 36, the tightening bolt 31—can be rotated, whereby the tightening hook 34 is displaced relative to the turnbuckle 30 and parallel to tightening bolt 31.

For assembly, the tightening roller chain 23 is suspended from a suitable post. Thereupon the tool is moved by means of a manipulator engaging the base plate 3 from one side and centrally to the tensioning roller chain 23 until the stop strip 6 comes to rest against the tensioning roller chain 23. This process is assisted by centering projections 39, 40, 41 at the stop strip 6, as best shown in FIG. 2, which always move in-between two adjacent single rollers 25.

In that configuration, which is shown in FIG. 1, the gripper members 20, 21, 22 are coaxial with the roller pins 24 of the end-side single rollers 25. The geometry of the gripper arms 16, 17 was designed correspondingly, that is, these arms assume these positions when the telescoping cylinders 18, 19 are in their particular retracted end positions.

The tensioning system 29 is appropriately kept in the post from which the tensioning roller chain 23 is suspended in such a position that the tightening bolt 31 will be in the position, shown in FIG. 1, which is coaxial with the screw-spindle 38. However, additional guide elements may be provided which, upon the approach of the tool 1, will cause the tensioning system 29 to pivot into the position shown if it is not already in it.

Thereupon the gripper members 20, 21, 22 are displaced toward each other, whereby they lockingly seize the spherical, projecting ends of roller pins 24. Next, the nut 37 is moved over the head 36 of the tightening bolt 31 to achieve coupling of the screw-spindle 38 with this tightening bolt 31 so that it projects widely.

Thereafter, the tool 1 is moved close to the flange 42 shown in FIG. 2 in such a manner that the two central single rollers 25 of the tensioning roller chain 23 come to rest against the flange 42. Next, the displacement cylinder 13 is supplied with compressed air, whereby the slide frame 7 is displaced in the direction of the tensioning roller chain 23. As a result, the pivot pins 14, 15 also are displaced in the same direction and therefore the tensioning roller chain 23 is placed around the flange 42; the ends of the tensioning roller chain 23 together with the front ends of the gripper arms 16, 17 defining an involute. The gripper arms 16, 17 cannot tip over because of the damping effects from the telescoping cylinders 18, 19.

In the final stage, the tensioning hook 34 comes to rest against the opposite single roller 25 held by the lower gripper arm 17. Simultaneously, the associated telescoping cylinder 19 is pressurized. Then the screw-spindle 38 and hence the tightening bolt 31 are set into motion whereby the tensioning hook 34 engages underneath the single roller 2 seized by the gripper arm 17, and whereby both ends of the tensioning roller chain 23 are pulled together. A defined torque is applied so that the flange 42 is compressed with a predetermined tensioning force. The flange connection is now closed.

The gripper members 20, 21, 22 are then detached, the nut 37 is moved back and the telescoping cylinders 18, 19 are so loaded with compressed air on the side of the piston rod that the gripper arms 16, 17 are moved back into the positions shown in FIG. 1. By correspondingly loading the displacement cylinder 13, the slide frame 7 moves back into its initial position.

To disassemble the flange connection, the tool 1 again is moved against the tensioning roller chain 23. The slide frame 7 is displaced toward the tensioning roller chain 23 by loading the displacement cylinder 13. Simultaneously, the telescoping cylinders 18, 19 are loaded with compressed air on the piston side, so that the gripper arms 16, 17 assume the position shown in FIG. 2. By activating the gripper members 20, 21, 22 the two ends of the tensioning roller chain 23 are seized. Also the nut 37 again is slipped over the screw head 36 of the tightening bolt 31 and the screw-spindle 38 is rotated in the opposite direction. As a result the tensioning hook 34 again is advanced into the position shown in FIG. 2 in dashed lines and thereby the two ends of the tensioning roller chain 23 will be disconnected. Upon resetting the two telescoping cylinders 18, 19 the tensioning roller chain can again be suspended from the stand.

Omitted from the drawing are the magnetic valves to drive the individual compressed-air cylinders. Moreover, the tool 1 may be equipped with sensors to automate the above described sequence of motions.

The use of the tool 1 is not restricted to tensioning roller chains 23. The tool 1 also may be used with other tensioning elements, illustratively tightening belts or split tensioning rings which are split several times in hinge-like manner to place them around a flange and then be tightened.

We claim:

1. A tool, mainly for placing by remotecontrol a tensioning roller chain or a like tightening element around a flange, in particular in nuclear works, and thereupon to carry out tightening, the ends of the tensioning roller chain being connected by a tensioning system including a tightening bolt, characterized by gripper members (20, 21, 22) to seize the ends of the tensioning roller chain (23) and by gripper arms (16, 17) on which the gripper members (20, 22) are mounted and of which at least one arm is kinematically displaceable by a displacement system (18, 19) in such a manner that the ends of the tensioning roller chain (23) can be guided around the flange (42) and toward each other, and by a coupling (37) at one of the gripper arms (16) for detachably engaging the tightening bolt (31) so that a tensioning motor (38) may drive the coupling (37) and thereby tighten the roller chain about the flange and so that the gripper arms may thereupon disengage from the coupling and the roller chain remain tightened about the flange.

2. Tool defined in claim 1, characterized by two gripper arms (16, 17) driven by displacement systems (18, 19) to pivot in one plane.

3. Tool defined in claim 2, characterized in that the spacing between the pivot pins (14, 15) of the gripper arms (16, 17) exceeds the diameter of the flange (42).

4. Tool defined in claim 3, characterized in that the spacing between the pivot pins (14, 15) of the gripper arms (16, 17) corresponds to the length of the tensioning roller chain (23).

5. Tool defined by claim 1, characterized by a base frame (2) on which at least the pivoting gripper arm(s) (16, 17) and the displacement system(s) (18, 19) are displaceably guided on a common plane (14, 15).

6. Tool defined by claim 2 characterized in that the gripper arms (16, 17) and the displacement systems (18, 19) are mounted on a common slide frame (7).

7. Tool defined in claim 6, characterized in that the base frame (2) comprises at least two guide rods (4, 5) guiding the slide frame (7).

8. Apparatus defined by claim 5 characterized in that a slide cylinder (13) resting on the base frame (2) is provided for the displacement.

9. Tool defined by claim 5, characterized in that the base frame (2) comprises at its front a stop strip (6) with projections (39, 40, 41) to engage the tensioning roller chain (23).

10. Tool defined in claim 9, characterized in that at least three projections (39, 40, 41) extend from the stop strip.

11. Apparatus defined by claim 1 characterized in that the displacement system(s) is (are) designed as pressure cylinder(s) (18, 19).

12. Tool defined by claim 1, characterized in that the gripper members (20, 21, 22) each comprise two seats for the laterally projecting ends of a roller pin (24) of the tensioning roller chain (23) which are movable in the direction of the axes of the roller pins (24).

13. Tool defined in claim 12, characterized in that each seat communicates with a pressure cylinder.

14. Tool defined by claim 1, characterized in that the tensioning motor is designed as a compressed-air driven screw-spindle (38).

15. Tool defined in claim 1, characterized in that the coupling (37) and the tightening bolt (31) are shaped to positively lock together.

16. A tensioning roller chain for use in the tool defined in claim 1, characterized in that the tensioning system (29) includes a tensioning hook (34) connected by means of a thread (32) with the tightening bolt (31) supported in a turnbuckle (30) pivotably suspended from the last chain link (25) of the tensioning roller chain (23).

17. An assembly for placing about and removing from a flange assembly an elongated tightening element having a coupling member carried by one end thereof for detachably coupling with the other end thereof, the coupling member comprising a tightener assembly operatively connected to a hook displaceable relative thereto for engaging the element other end, the assembly comprising:
(a) a base;
(b) first and second spaced gripper arms operatively connected to said base, at least one of said gripper arms being movable toward the other;
(c) a plurality of gripper members, each arm carrying a pair of spaced cooperating gripper members;
(d) means operatively connected to said gripper members for causing cooperative displacement thereof so that a tightening element may be gripped or released;
(e) means operatively interconnecting said base and said gripper arms for cooperatively displacing said arms toward and away from a flange assembly;
(f) operating means carried by one of said arms for detachably and drivingly engaging the tightener assembly and thereby causing displacement of the hook relative thereto; and,
(g) means operatively associated with said one arm for causing movement thereof.

18. The assembly of claim 17, wherein:
(a) said operating means is carried by said one arm; and,
(b) said operating means includes a rotary element engageable with the tightener assembly.

19. The assembly of claim 17, wherein:
(a) said gripper member displacement means comprises a plurality of cylinder assemblies, each cylinder assembly operatively connected with one of said gripper members; and,
(b) said movement causing means includes a cylinder and piston assembly.

20. The assembly of claim 17, wherein:
(a) each of said arms is pivotal and said arms pivotal on a common plane; and,
(b) a cylinder and piston assembly operatively connected to each of said arms for causing pivoting thereof.

* * * * *